US008755595B1

(12) United States Patent
Bissacco et al.

(10) Patent No.: US 8,755,595 B1
(45) Date of Patent: Jun. 17, 2014

(54) AUTOMATIC EXTRACTION OF CHARACTER GROUND TRUTH DATA FROM IMAGES

(75) Inventors: Alessandro Bissacco, Los Angeles, CA (US); Krishnendu Chaudhury, Bangalore (IN)

(73) Assignee: Google Inc., Mountain View, CA (US)

( * ) Notice: Subject to any disclaimer, the term of this patent is extended or adjusted under 35 U.S.C. 154(b) by 139 days.

(21) Appl. No.: 13/186,173

(22) Filed: Jul. 19, 2011

(51) Int. Cl.
*G06K 9/62* (2006.01)

(52) U.S. Cl.
USPC .......................................... 382/159

(58) Field of Classification Search
USPC ....................................... 382/159
See application file for complete search history.

(56) References Cited

U.S. PATENT DOCUMENTS

| | | | | |
|---|---|---|---|---|
| 5,594,809 | A * | 1/1997 | Kopec et al. | 382/161 |
| 5,689,585 | A * | 11/1997 | Bloomberg et al. | 382/229 |
| 7,590,275 | B2 * | 9/2009 | Clarke et al. | 382/137 |
| 7,817,855 | B2 * | 10/2010 | Yuille et al. | 382/176 |
| 8,208,726 | B2 * | 6/2012 | Eshghi et al. | 382/177 |

OTHER PUBLICATIONS (Tapas Kanungo, "An Automatic Closed-Loop Methodology for generating Character Groundtruth for Scanned Documents"; Feb. 1999; IEEE Transactions on Pattern Analysis and machine Intelligence, vol. 21, No. 2).*
(John Hobby, "Matching Document Images with Ground Truth"; 1998; Springer-Verlag).*
(Gang Zi, "Document Image Ground Truth Generation from Electronic Text", 2004, IEEE,Proceedings of the 17th International Conference on Pattern Recognition (ICPR'04)).*
Van Beusekom, J., et al., "Automated OCR Ground Truth Generation," *Proceedings of the 8th IAPR International Workshop on Document Analysis Systems*, pp. 111-117, IEEE Computer Society, Japan (Sep. 2008).

* cited by examiner

*Primary Examiner* — Samir Ahmed
*Assistant Examiner* — Totam Le
(74) *Attorney, Agent, or Firm* — Fish & Richardson P.C.

(57) ABSTRACT

Embodiments for automatic extraction of character ground truth data from images are disclosed. A transcription may be rendered in a plurality of fonts and orientations to obtain a set of candidate word templates with associated character bounding boxes. A word template may be selected from the set of candidate word templates, wherein the selected word template corresponds to a word patch from an image. The character bounding boxes, of the selected word template, may be evaluated in a plurality of orientations about each respective character from the word patch to obtain a set of candidate character templates. For each respective character from the word patch, a character template may be selected from the set of candidate character templates, wherein each selected character template corresponds to the respective character from the word patch. Character ground truth data comprising the selected character templates oriented to correspond to the word patch, may be provided as training data for recognizing the characters of the word patch from the image.

19 Claims, 9 Drawing Sheets

Character Ground Truth Data 424

AUTOMATIC EXTRACTION OF CHARACTER GROUND TRUTH DATA FROM IMAGES

BACKGROUND

Background Art

Optical character recognition (OCR) involves the recognition of characters found in electronic images. The characters are often parts of words that are captured in the images. For example, OCR is often used to recognize characters found in scanned images of documents, books, newspapers, journals and other print media. The OCR systems may analyze the scanned documents and output machine-encoded text corresponding to the characters that were recognized in the scanned images.

Ground truth data may be collected from and/or about a scanned image to facilitate an OCR engine's operation or training. For example, ground truth data may be symbolic data (such as encoded text) and associated layout or location information (such as a bounding box associated with the encoded text). An OCR engine may be trained using this ground truth data to enable the OCR engine to recognize characters or other data in this and subsequent images.

Conventional OCR engines have used synthetic training or ground truth data extracted from test images in limited, controlled circumstances. For instance, the synthetic data or test images may be generated by rendering text in a controlled environment using a variety of fonts and geometric transformations. From these synthetic images, an OCR engine may be trained to recognize the characters of the image but with limited capabilities. For example, such an OCR engine may be able to identify a character from an image with clearly legible or well-defined text taken in controlled conditions, such as with scanned images of books or other print media. However OCR engines trained with such synthetic data have difficulty identifying characters on images when the images are taken in less-than-ideal conditions and/or in uncontrolled environments. For example, OCR engines trained on synthetic data may have difficulty identifying characters, symbols, words and/or other text from pictures that may have low light issues, blur, and/or other distortions as discussed above.

One approach used to improve the conventional OCR techniques described above has been to use test images from controlled environments and try and introduce synthetic noise or distortions designed to replicate possible real-world or uncontrolled distortions. The synthetic noise distortions are added to try and create images that resemble real-life images taken in uncontrolled environments. However this approach in training OCR engines still yields trained OCR engines that have difficulty identifying characters, symbols, words and/or other text in images from uncontrolled environments. Often because the distortion that occurs with images taken in uncontrolled environments may be difficult to synthetically predict and/or reproduce.

These problems are increasing as OCR engines and ground truth data extractors are confronted with images of variable quality obtained from a variety of sources. Examples of such images may include images that may have originally been taken by a mobile device such as a camera on a mobile phone and/or images that may have been taken in an environment with varying or less-than-ideal circumstances, such as, images taken with a low camera resolution, poor lighting and/or out-of-focus. For example, images that may have a variable quality or even a low quality are images of street signs, storefront lettering or other text taken with mobile cameras by users outdoors or indoors. Such images captured in uncontrolled or less-than-ideal camera environments are often difficult to process in an OCR engine. Automatic extraction of ground truth data from such images has been too difficult and error prone.

BRIEF SUMMARY

Methods, systems, and computer program products are provided to automatically extract character ground truth data for training or input to OCR engines. Automatically extracted character ground truth data may include character bounding boxes from images given a set of word bounding boxes and transcriptions.

According to an example embodiment, a method is disclosed. A transcription may be rendered in a plurality of fonts and orientations to obtain a set of candidate word templates with associated character bounding boxes. A word template may be selected from the set of candidate word templates. The selected word template may correspond to a word patch from an image. The character bounding boxes of the selected word template may be evaluated in a plurality of orientations about each respective character from the word patch to obtain a set of candidate character templates. For each character from the word patch, a character template may be selected from the set of candidate character templates. Each selected character template may correspond to the respective character from the word patch. Character ground truth data including the selected character templates oriented to correspond to the word patch may be provided as training data for recognizing in other images the characters of the word patch.

According to an example embodiment, a system is disclosed. The system may include one or more processors and a memory coupled to the one or more processors. A template generator may render a transcription in a plurality of fonts and orientations to obtain a set of candidate word templates with associated character bounding boxes, and select a word template from the set of candidate word templates. The selected word template corresponds to a word patch from an image. A character box refiner may evaluate the character bounding boxes of the selected word template in a plurality of orientations about each respective character from the word patch to obtain a set of candidate character templates. The character box refiner may select, for each respective character from the word patch, a character template from the set of candidate character templates. Each selected character template corresponds to a respective character from the word patch. An output formatter may provide character ground truth data including the selected character templates oriented to correspond to the word patch as training data. This training may be used to recognize in other images the characters of the word patch.

According to an example embodiment, a computer program product including a computer readable medium having computer program logic recorded thereon that, when executed by a processor, enables the processor to extract ground truth from images is disclosed.

According to an example embodiment, a method for obtaining training data for an OCR (optical character recognition) engine is disclosed. Coarse ground truth data may be stored. Character-level ground truth data may be automatically extracted from the coarse ground truth data. The find ground truth data may be output to train an OCR engine.

Other embodiments may include corresponding systems, apparatus, and computer programs, configured to perform the actions of the methods, encoded on computer storage devices. Further embodiments, features, and advantages, as well as the structure and operation of the various embodiments are described in detail below with reference to accompanying drawings.

BRIEF DESCRIPTION OF THE DRAWINGS/FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Embodiments relate generally to the automatic extraction of character ground truth data from images. Computer-implemented methods, systems, and computer program products are provided to automatically extract character ground truth data for training or input to OCR engines. Automatically extracted character ground truth data may include character bounding boxes from images given a set of word bounding boxes and transcriptions.

System

Figure 1:
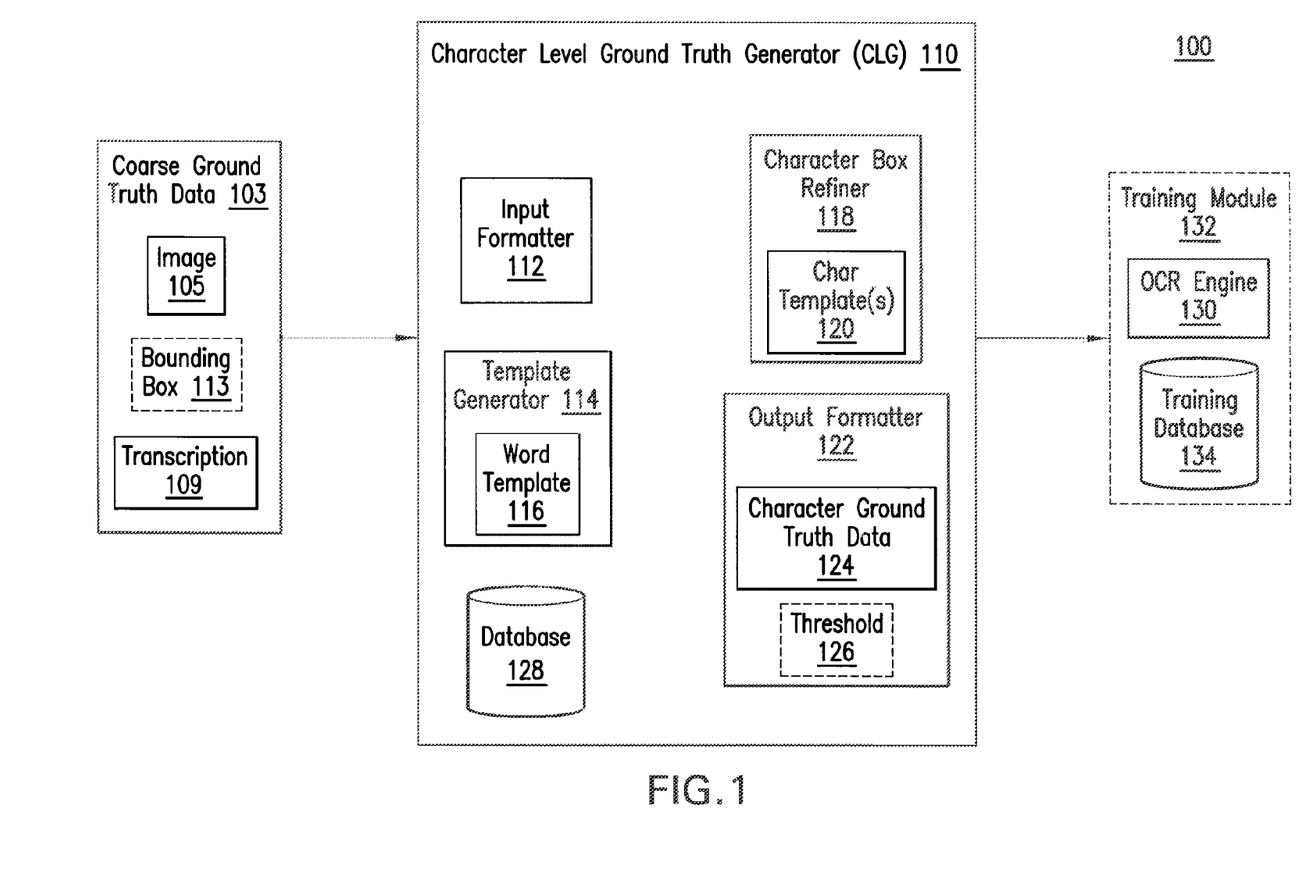
FIG. 1 is a block diagram of an exemplary system by which to automatically extract character ground truth data from images.

Disclosed herein is a system for extracting character ground truth data from images. The system 100 as shown in FIG. 1 may automatically extract character ground truth data from images taken in uncontrolled environments. The character ground truth data may then be used to train optical character recognition (OCR) engines or devices to recognize characters, symbols, words and/or other text or items from images taken in real-world or uncontrolled environments. The system 100 may provide information to train OCR engines to identify characters, symbols, words and/or other text or other items from noisy images taken in uncontrolled or street environments.

Uncontrolled environments may include those environments or circumstances that occur in everyday life. For example, images taken from a street or in a park. Capturing images in these environments, amongst many others, may increase the likelihood that the captured images may include some level of distortion. The distortion may be from the environment and/or the device capturing the image. Examples of distortion that may occur in images include blur, movement, low-light, bright-light and other distortions. For example, an image of a street sign captured with a mobile device may be an example image from an uncontrolled environment. By contrast, controlled environments may include those situations in which many of these potential distortions are avoided and/or added synthetically. Example controlled environments may include scans from scanners, images in a studio, or pictures of printed text from books and other printed material or resources.

While the system 100 may process both synthetic (e.g., from controlled environments) and real-world images (e.g., from uncontrolled environments), it is the processing of real-world images by the system 100 that may allow for more effective training of OCR devices, especially OCR devices called upon to process images obtained from a variety of cameras and environments including those that may increase distortion in a scanned or captured image.

In an embodiment, system 100 may include a character-level ground truth generator (CLG) 110 that refines or processes coarse ground truth data 103, and provides an output of character ground truth data 124 that may be used to train an OCR engine 130.

Coarse ground truth data 103 may include information such as photographic and/or layout data about one or more images. Coarse ground truth data 103 may include, for example, an image 105 and a transcription 109. Image 105 may be any photograph, frame or rendering of an image with characters, symbols, words and/or other text or other items. Image 105 may be any image or photograph, and can be taken from controlled or uncontrolled environments. Image 105 may include some distortion, such as blur and/or lighting issues, especially if taken in an uncontrolled environment. For example, image 105 may include a picture of a street sign as taken from a cell phone. The distortion may cause, for example, the characters of the street sign to appear blurred or difficult to read due to lighting issues and/or the quality of image capture from a cell phone.

For simplicity sake, it should be understood that herein characters, symbols, words and/or other text or other items may be collectively referred to simply as words, text and/or characters. It should be understood that the embodiments disclosed herein are not limited to characters and letters, but may also include other symbols or numerals and may include text from any language, including but not limited to Latin-based languages such as English.

Transcription 109 may include the text or translation of whatever appears in image 105 and is to be identified or processed by system 100. For example, image 105 may include a photograph of a street sign that reads "Route 123", then for example, transcription 109 may include the text "Route 123". Image 105 may also include distortion, which may make the text difficult to discern or read. In this way, transcription 109 may provide what text appears (and/or was meant to be captured) in image 105, and may be used to help identify the characters of the transcription 109 in image 105. According to an example embodiment, transcription 109 may be determined by a manual operator, or other system, that views image 105 and determines what text of the image is valuable and/or needs to be identified by CLG 110, and provides transcription 109 as part of the coarse ground truth data 103 and/or otherwise in association with image 105.

According to an example embodiment, coarse ground truth data 103 may include or otherwise be associated with a bounding box 113. Bounding box 113 may include layout information about image 105. Bounding box 113 may include an indication of where the text of transcription 109 appears in image 105. For example, image 105 may include non-text, non-character space and/or may include multiple text or words not all of which are to be identified by system 100.

Bounding box 113 may then identify where within image 105 the text of transcription 109 is located. Bounding box 113 may include, for example, coordinates of a rectangular box that contains the text to be identified.

In another example embodiment, bounding box 113 may include a perimeter that loosely bounds the word(s) to be processed in image 105. For example, bounding box 113 may include a rectangle or other shape rendered on or with image 105, wherein inside the word(s) to be identified or processed by system 100 may be included within the area of bounding box 113. In an example embodiment in which a more detailed representation of the characters or words of image 105 may be desired, a binary mask, in which character pixels are turned on and background pixels are turned off, may be used. In other example embodiments bounding box 113 may be a non-quadralinear shape, having more or less than four sides, such as a triangle, oval or pentagon.

In other example embodiments, bounding box 113 may be a quadrilateral, but not necessarily a rectangle. For example, if image 105 is an image taken at an angle, includes italicized and/or otherwise non-horizontal or slanted text, a general quadrilateral (or other shape) may provide a better suited bounding box 113 than a rectangle. Then for example, OCR engine 130 may use a rectification process that may transform the quadrilateral patch of image 105 into a rectangular patch. In an example embodiment, system 100 may use shear mapping, whereby points on a first axis are fixed and points on a second axis are shifted parallel to the first axis by a distance proportional to their perpendicular distances from the first axis, to handle bounded italicized text. Or for example, system 100 may use affine transformations to handle bounded non-frontal or otherwise angular images. This may however, as discussed in greater detail below, result in system 100 needed to process a larger number of configurations for images 105 associated with non-rectangular bounding boxes 113.

In an example embodiment, bounding box 113 may include multiple bounding boxes 113 identifying one or more portions of image 105 including one or more words, characters and/or other text. For example, in the case of multiple bounding boxes 113, transcription 109 may include one or more transcriptions of the words or text within bounding boxes 113. According to an example embodiment, bounding box 113 may be identified or determined by a manual operator or other system that views image 105 and renders bounding box 113. For example, the same or different operator may determine transcription 109 and bounding box 113.

Coarse ground truth data 103, e.g., image 105, transcription 109 and bounding box 113, may be received by an input formatter 112. Input formatter 112 may extract a word patch from image 105 based on bounding box 113. The word patch may include that portion or portion(s) of image 105 identified by the bounding box 113. For example, input formatter 112 may crop the pixels of the image 105 bounded or otherwise identified by bounding box 113. According to an example embodiment, input formatter 112 may crop the word patch, convert it to grayscale, and scale it to a common height. Input formatter 112 may draw or otherwise render bounding box 113 based on coarse ground truth data 103 that may, for example, indicate where bounding box 113 is to be rendered.

A template generator 114 may generate a word template 116 for the word patch as determined by input formatter 112. Template generator 114 may render transcription 109 in a variety of fonts and orientations to obtain a set of candidate word templates. For example, template generator 114 may render transcription 109 in the font "Times New Roman" and compare that against the image in the word patch. Template generator 114 may then adjust the orientation of the rendered transcription by adjusting the font size, physical alignment, spacing, boldness, italics, (pixel) offset, color and/or other font characteristics to try and align or match the rendered transcription to the corresponding word from the word patch. Template generator 114 may repeat this process for a variety of fonts at a variety of orientations, scoring and/or otherwise evaluating a number of the fonts and orientations based on how closely the font/orientation of transcription 109 corresponds to the word from the word patch. Template generator 114 may then select one of the candidate word templates (e.g., one with the highest score or correlation to the word from image 105) as word template 116.

The selected word template 116 may include one of a plurality of fonts at one of a plurality of orientations, as determined to correspond to a word from image 105. As just referenced, template generator 114 may render transcription 109 in a font and at an orientation based on the selected word template 116 to correspond to a portion of image 105 (e.g., the word patch). Template generator 114 may use any approach to determine the font and orientation including for example, first determining the font that most closely resembles the text of the word patch and then determining how to orient the font, or determining the font and orientation in tandem.

According to an example embodiment, template generator 114 may render a binary template (e.g., word template 116) containing a rendering of transcription 109 in a selected or current font, whereby the rendering may be scaled to a range of heights and widths, for example, between 40% and 100% of the word patch width and heights between 50% and 100% of the word patch height (parameters tuned empirically). For each one of these scaled binary templates, template generator 114 may compute a normalized cross correlation scores (NCC) with the word patch at all possible (or at least multiple different) positions or orientations. This may result in template generator 114 producing an array of correlation scores for each scaled template, from which the template with the highest score may be selected, and its position together with the (known) scaled template bounding boxes 113 may produce the bounding boxes of both word and symbols or characters (e.g., character templates 120) in the word patch.

Even though word template 116 may closely correlate to or match the word from input image 105, there may be some variation or gap between individual symbols or characters of word template 116 and the word from (the word patch of) image 105. A character box refiner 118 may repeat a variation of the NCC match discussed above with regards to template generator 114 for the characters of the word. Word template 116 may include one or more character bounding boxes that correspond to characters from the word patch. For example, the binary template (e.g., word template 116) may include a location or layout of the characters or symbols of the word based on the selected font and/or orientation. Thus from the selected word template 116, character box refiner 118 may determine character bounding boxes for one or more characters of the word (of image 105).

Character box refiner 118 may evaluate the character bounding boxes in a plurality of orientations about each respective character from the word patch to obtain a set of candidate character templates. Character box refiner 118 may then select, for each respective character from the word patch, a character template 120 (i.e., char template 120). The selected char template(s) 120 may include the character bounding boxes from word template 116, further oriented to more closely correspond to the individual (or clusters of) characters from the word of image 105. According to an example embodiment, the orientation of the character bounding boxes may be limited to a maximum variance from the character bounding boxes as determined from word template 116.

This further orientation on the character level, by character box refiner 118, may produce a set of candidate character templates, which may be scored based upon their correspondence to a respective character from the word. Then, for example, character box refiner 118 may, for each character of the word from image 105, select a char template 120 with a highest score or correspondence to image 105.

As used herein, char template 120 may be a portion of word template 116, though need not be limited to a single character. For example, if word template 116 includes the phrase "Hello World!", char templates 120 may include a template for each character or symbol such as "H" "e" "l" . . . "!", or char templates 120 may include another subset of the phrase such as "Hello" and "World!", or "he", "llo", "wor", "ld", and "!". In another example embodiment if word template 116 included a symbol, then char template 120 may include one or more portions of that symbol.

As just referenced, character box refiner 118 may generate one or more character templates 120 for the characters of the word from the word patch. Character box refiner 118 may determine one or more character bounding boxes from word template 116. The character bounding boxes, similar to word bounding box 113, may include bounding boxes that more precisely identify the characters of the word or text from the word patch. For example, if word bounding box 113 identified the text "First Street" in image 105 or word patch. Then, from word template 116, character box refiner 118 may determine a character bounding box for each letter or character of "First Street", For example, the first character bounding box may correspond to the "F" and the last character bounding box may correspond to the final "t" from "Street".

Character box refiner 118 may, for example, start with the first character bounding box and generate a char (character) template 120 for each character of the word template 116. According to an example embodiment, the character bounding boxes may be determined based on word template 116. For example, because the characters and spacing and size of the word or text of word template 116 may already be known, the character bounding boxes around each character may be determined by character box refiner 118. Character box refiner 118 may then adjust or orient each character bounding box to more closely align to the individual character (or group of characters or symbols) to which the character bounding box corresponds. Character box refiner 118 may perform a similar function as described above with regards to template generator 114 as it may determine the orientation of the font for word template 116, however, rather than orienting the entire word or group of characters, character box refiner 118 may orient one character at a time as per the character bounding box. Though in other example embodiments, character box refiner 118 may orient multiple characters or any smaller portions of word template 116 at once.

As just referenced, character box refiner 118 may orient or adjust the characters (character boxes) of word template 116 to more closely match their alignment and other characteristics to the characters from the word patch. This process may allow CLG 110 to correct for the various ways words and/or characters may be oriented or may appear in images, especially those captured in uncontrolled environments. For example, road signs or street signs such as restaurant or store banners may include various scripts or fonts that may or may not be perfectly aligned, in contrast to books where words are more likely be properly aligned, and being able to adjust each character (or group of characters) by character box refiner 118 may allow CLG 110 to determine more accurately how the text of image 105 has been captured (and/or otherwise identify that text in image 105). Based on each character alignment or realignment of the character bounding boxes, character box refiner 118 may generate char template 120 that includes the realigned or oriented character bounding box. In some example embodiments, not all of the characters may need alignment or adjustment by character box refiner 118.

According to an example embodiment, character box refiner 118 may fine-tune or adjust the orientation (as determined by template generator 114 for word template 116) within a certain bound. Character box refiner 118 may, in such instances, adjust the appearance or orientation of the characters of the character bounding boxes, rather than completely re-orientating them again from scratch. In example embodiments, there may be bounds on the orientation that may limit how many pixels the characters of char templates 120 may be offset (e.g., 2 pixels) and/or a maximum degree of rotation allowed (e.g., 20 degrees). For example, a word patch that has a height of 32 pixels, may be associated with a maximum bounded orientation of ±2 pixels in the horizontal and/or vertical directions. Other example embodiments may include other proportional bounds, or no bounds at all. Character box refiner 118 may store the reoriented character bounding boxes as one or more char templates 120. In other example embodiments however, character box refiner 118 may adjust the character boxes without any specified bounds to better align the character box (of char template 120) with the corresponding word patch character.

An output formatter 122 may generate character ground truth data 124 based on char templates 120. Output formatter 122 may, for example, reassemble, realign, resize, and/or otherwise reorient char templates 120 to more closely correspond to word template 116 and/or the word patch. For example, output formatter 122 may scale char templates 120 based on the original image 105 (or word patch) or word template 116 to generate character ground truth data 124. Character ground truth data 124 may include, for example, the reoriented char templates 120 each provided for training OCR engine 130. While character ground truth data 124 may include any combination(s) of one or more of char templates 120 that may or may not have been regrouped for training OCR engine 130.

In examples, output formatter 122 may score or otherwise rate the character ground truth data 124 and/or otherwise compare it to a threshold 126. Threshold 126 may include an indication of a level of required correlation between character ground truth data 124 and image 105 (and/or word patch). Output formatter 122 may, for example, compute a score for character ground truth data 124, the score indicating how closely the character ground truth data corresponds to the text (or other symbols) of image 105 (or word patch) and then compare that score to threshold 126.

If the score meets or exceeds threshold 126, then output formatter 122 may provide character ground truth data 124 to a database 128 and/or a training module 132. If the score however is below threshold 126, output formatter 122 may discard the character ground truth data. Threshold 126 may be useful to indicate a level of correspondence between character ground truth data 124 and image 105, such that only appropriate and/or accurate character ground truth data 124 (e.g., that meets certain quality expectations) may be used to train OCR engine 130. Threshold 126 may be applied on a character-by-character basis and/or a word-by-word basis depending on the embodiment of system 100.

According to an example embodiment, if there are multiple words on the same line in input image 105, output formatter 122 may perform a consistency check amongst the words appearing on the same line. For example, output formatter 122 may check that extracted word patches from the same line may fall within a min/max height ratio, whereby if the one or more of the words do not meet this requirement, all of the words on that line will be rejected (or in other embodiments, readjusted). Other example embodiments however may invoke less conservative filters that allow greater variation amongst multiples words of an image 105 that appear on the same line or horizontal and/or vertical plane.

Database 128 may be used to store any state information for system 100. Database 128 may for example store received coarse ground truth data 103, including image 105, transcription 109 and/or bounding box 113 data. Database 128 may also store word template 116, word patch, character bounding box, font, orientation, char template 120, threshold 126 and/or character ground truth data 124 as processed by system 100.

Training module 132 may include an OCR engine 130 and a training database 134. Training module 132 may use character ground truth data 124 to train OCR engine 130 to recognize character text and/or symbols or words from images 105. Training database 134 may include, for example, character ground truth data 124 and any other image or training data necessary or useful to train OCR engine 130.

OCR engine 130 may include any optical character recognition engine or device used to identify characters, symbols, text words or other portions of one or more images. OCR engine 130 may translate the text of image 105 into typewritten, printed or otherwise machine-encoded text. Training module 132 may train and/or calibrate OCR engine 130 to recognize fonts, words and/or other characters based on character ground truth data 124 as determined from images 105 (taken in uncontrolled environments). OCR engine 130 may then produce formatted output that closely approximates or otherwise identifies the text of the original image 105.

According to an example embodiment, system 100 may be used to train OCR engine 130 to read or recognize text, words, characters or other objects from real-world images 105 that may have been taken in uncontrolled environments. Training OCR engine 130 using these images (and corresponding character ground truth data 124) from uncontrolled environments allows training module 132 to better train OCR engine 130 to recognize objects from real-world (e.g., non-training) images because OCR engine 130 may be trained on images with real world noise, rather than images with synthetically induced noise.

In order to train OCR engine 130 to work on a wider variety of images such as those taken from uncontrolled environments, images that may exist on or be captured from the Internet and/or images that are used to capture scenery such as street-level imagery but may include characters to be identified and extracted from those images. Manual character extraction, e.g., by one or more operators drawing a bounding box and typing the character for each character in image 105, would be very expensive and error-prone. System 100, by contrast, may implement a hybrid approach. System 100 may receive the word-level or coarse ground truth data 103, which may include a loose or word bounding box 113 identifying word(s) to be identified and a transcription 109 corresponding to one or more of bounding boxes 113. According to an example embodiment, word bounding box 113 and/or transcription 109 may be manually determined by an operator, which unlike manual character extraction, may be relatively cheap to obtain manually from operators. System 100 may then process coarse ground truth data 103 to produce fine or character-level ground truth data 124 which in turn may be used to train one or more OCR engines 130.

Conventional schemes may try to obtain character-level ground truth from word-level ground truth by running an OCR engine on transformations of the word patch until the OCR engine recognizes the actual word, and then use the bounding boxes returned by the OCR engine. This alternative would produce a dataset that is biased toward the OCR engine used to collect it, which if used for training has the risk of producing an engine that is not significantly better than the one used to collect the data. System 100, by contrast, may be used by any party developing an OCR engine 130 (especially for camera-based OCR), as a mean to collect ground truth data from real images for training.

System 100 may use a two-step approach of first generating word template 116 and then refining word template 116 into a series of char templates 120. In the first step, template generator 114 may render transcription 109 of the word using a variety of fonts at various possible positions/rotations/scales to match the word existing inside the provided bounding box 113 (or word patch), and keeps or selects the binary or candidate word template with the highest correlation or score with image 105, as word template 116. The resulting word template 116 may provide a match that gives a pretty accurate and tight bounding box for the whole word (from image 105) but whose character bounding boxes may be not be precisely aligned with the corresponding actual characters of image 105. This may be due, in part, because of distortions in image 105 that may not be fully accounted for in word template 116 or of a mismatch between a rendered font and an actual font.

A second step, which may be applied by system 100, is to refine the character boxes or character bounding boxes. Character box refiner 118 may perform translations or apply orientations to each character box from word template 116 to produce one or more char templates 120. The translations or orientations may be applied around the position predicted by the word match or word template 116. The adjustment to the character bounding boxes may be performed to increase a correlation between the character bounding boxes and the corresponding characters from the real image 105, whereby the character bounding boxes that most closely correlate to image 105 may be selected as char templates 120. In an example embodiment, this refinement may be limited or constrained to small displacements in order to avoid letters from drifting away and/or moving so far as to no longer match neighboring characters (char templates 120) with similar shape. Then, output formatter 122 may apply a filter based on the normalized-cross-correlation (NCC) score and/or the relative position of characters to reject bad matches based on threshold 126. This may produce more accurate character ground truth data or training data 124 that may be used for training OCR engine 130. For brevity, the operation of system 100 is described further below with respect to method 200 but is not necessarily intended to limit the method 200 to the structure of system 100.

Method

Figure 2:
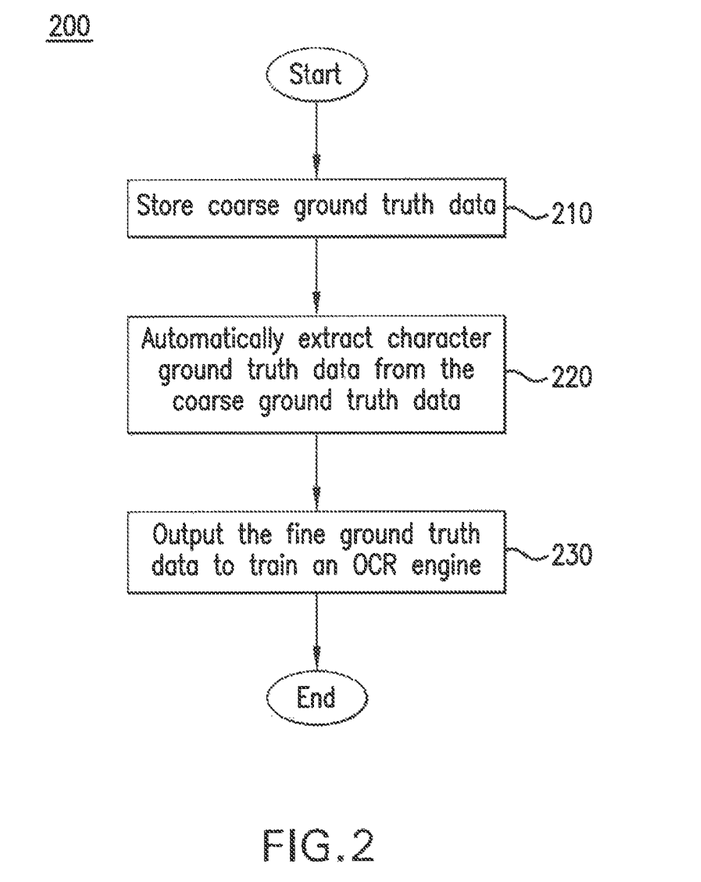
FIG. 2 is a flow chart of an example method for obtaining data for training an OCR engine.

FIG. 2 is a flow chart of an example computer-implemented method 200 for obtaining data for training an OCR engine. At step 210, after a start step, coarse ground truth data may be stored. In reference to FIG. 1, for example, database 128 may store coarse ground truth data 103. Coarse ground truth data 103 may include an image 105 taken in an uncontrolled environment, whereby image 105 may include some text, words or other characters or symbols. Coarse ground truth data 103 may also include a transcription 109 of the text appearing in image 105 and a bounding box 113 loosely indicating where within the image the text appears or where the image is to be cropped.

At step 220, character ground truth data may be automatically extracted from the coarse ground truth data. For example, input formatter 112 may crop a word patch from image 105 based on bounding box 113, from which template generator 114 may generate word template 116 that includes a font, from a plurality of fonts, selected and oriented to most closely correspond to the text from the word patch. Then character box refiner 118 may adjust the character boxes of the word patch and produce one or more char templates 120. Char templates 120 may provide tighter bounding boxes around one or more portions of the text of image 105 (in contrast to the looser word bounding box 113 received by input formatter 112). So, for example, though coarse ground truth data 103 may include word-level ground truth data including and/or about image 105, the system may automatically extract the character or character-level ground truth data 124 as described above.

At step 230, the character ground truth data may be output to train an OCR engine. For example, output formatter 122 may rescale char template(s) 120 to generate character ground truth data 124. Output formatter 122 may then determine a score for or otherwise rate character ground truth data 124 based on a correlation between character ground truth data 124 and the original image 105 and/or the word patch, and determine whether the score exceeds correlation threshold 126. If the score exceeds correlation threshold 126, character ground truth data 124 may be provided to training module 132 to train OCR engine 130.

In an example embodiment, the score may be provided to training module 132, whereby a higher score with character ground truth data 124 may allow for greater or more accurate training of OCR engine 130. For example, a higher-scored character ground truth data 124 may be used more heavily than a lower-scored character ground truth data 124, even though both scores may exceed threshold 126. After step 230, the method 200 may end.

Automatic Extraction of Character Ground Truth Data

Figure 3:
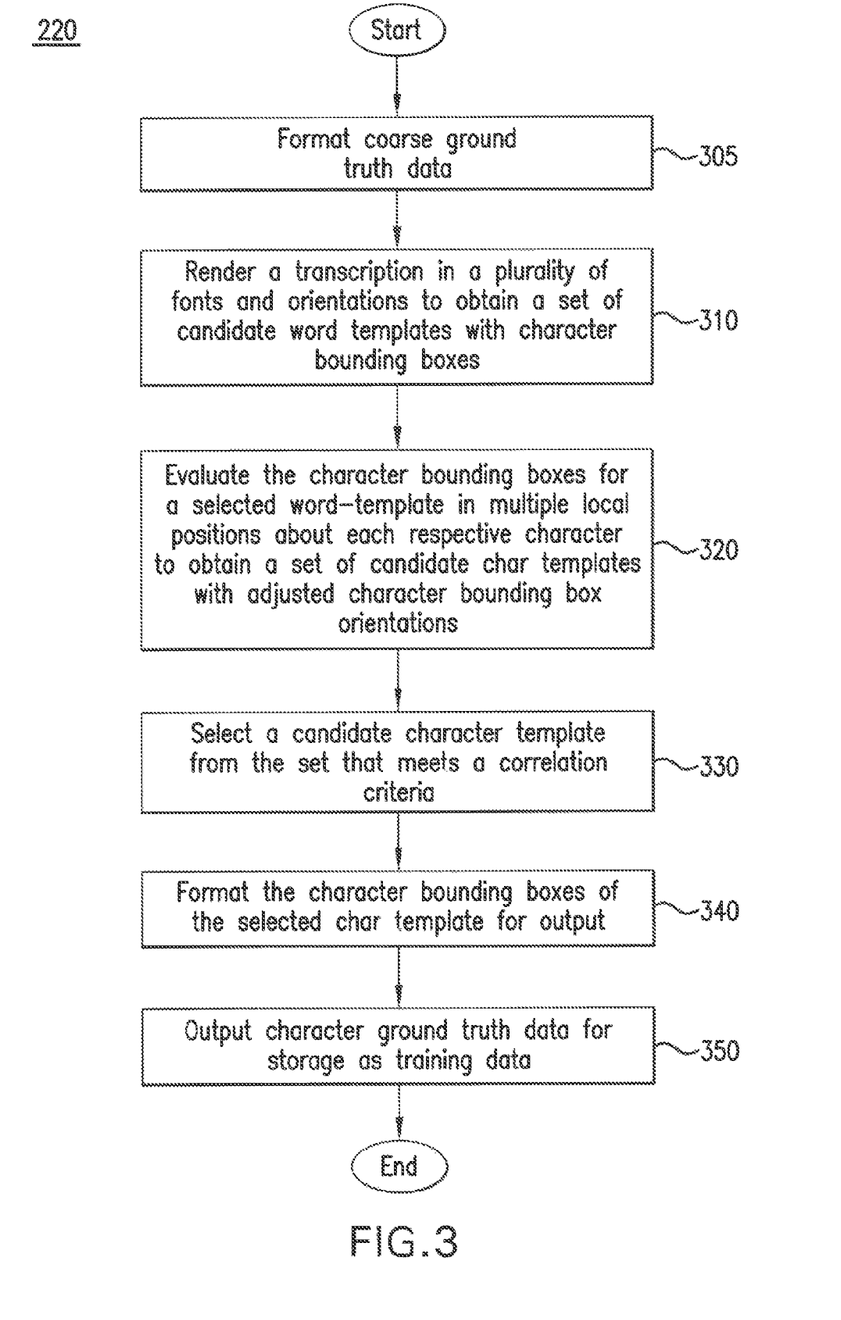
FIG. 3 is a flow chart of an example method for the automatic extraction of character-level ground truth data from coarse ground truth data.

FIG. 3 is a flow chart of an example method for the automatic extraction of character ground truth data from coarse ground truth data as shown in step 220 of FIG. 2. At step 305, coarse ground truth data may be formatted. In reference to FIG. 1, for example, input formatter 112 may crop a portion of image 105 based on hounding box 113 to produce a word patch. Input formatter 112 may, according to an example embodiment, convert the word patch to grayscale and scale it to a common or known height.

At step 310, a transcription may be rendered in a plurality of fonts and orientations to obtain a set of candidate word templates with character bounding boxes. For example, template generator 114 may render transcription 109 in a plurality of fonts and orientations to obtain one or more candidate word templates. Template generator 114 may then score, rank or otherwise rate the candidate word templates based on a correlation between the font and orientation with the corresponding text of the word patch. Based on the scores, template generator 114 may select the candidate template with the highest score as word template 116. In other example embodiments, template generator 114 may select several candidate template that either are closely scored highest and/or meet or exceed a threshold. Each one of several selected word templates 116 may then be processed by Character box refiner 118 as discussed. From word template 116, character box refiner 118 may determine character bounding boxes for each character of word template 116.

At step 320, the character bounding boxes for a selected word template may be evaluated in multiple local positions about each respective character to obtain a set of candidate char templates with adjusted char bounding box orientations. For example, character box refiner 118 may, for each character bounding box, adjust, orient or otherwise evaluate the character hounding boxes in a variety of positions to find the orientation that most closely correlates to the corresponding character from image 105. Character box refiner 118 may, for example, render the character box of word template 116 on top of the corresponding text or character from the word patch. Character box refiner 118 may then adjust the visual properties of the character of the Character box to increase a correlation between the character from the character box and the character from the word patch.

At step 330, a candidate char template that has the highest correlation score may be selected for each known character from the set. For example, character box refiner 118 may score or otherwise rate each of the variety of positions of the candidate char templates based on the level of correlation with the corresponding character of image 105 (and/or word patch). Then for example, character box refiner 118 may select a candidate template, for each character (of word template 116) that has the highest score.

At step 340, the character bounding boxes of the selected char templates may be formatted for output. For example, output formatter 122 may format char templates 120 for output. Formatting char template 120 for output may include for example, scaling or resealing char templates 120 based on the original image 105 or word patch so that the word or text as rendered from char templates 120 more closely corresponds to the original image 105 as character ground truth data 124.

At step 350, character ground truth data may be output for storage as training data. For example, output formatter 122 may score character ground truth data 124 based on its correlation to the image 105 and/or word patch. Output formatter 122 may then compare the score to threshold 126, whereby if the score is less than threshold 126, character ground truth data 124 may be discarded as being bad data by which not to train OCR engine 130. Or for example, if the score meets or exceeds threshold 126, then character ground truth data 124 may be provided to training module 132 and stored in the training database 134. Training module 132 may, according to an example embodiment, collect character ground truth data 124 for a variety of images 105, store character ground truth data 124 in training database 134, and when a large enough sample of character ground truth data 124 has been collected, use the data from training database 134 to train one or more OCR engines 130. After step 350, the method 220 may end.

EXAMPLES

Figure 4A:
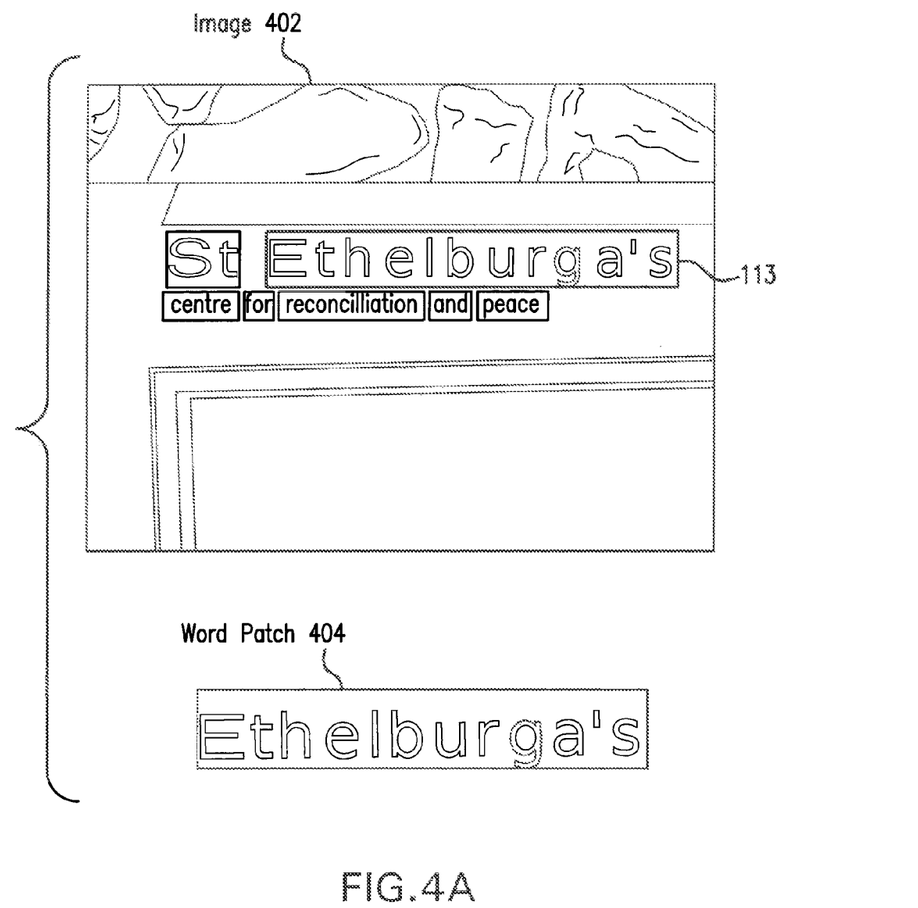
FIG. 4A illustrates examples of an image and a word patch, according to an embodiment.

FIG. 4A illustrates examples of an image and a word patch, according to an embodiment. In FIG. 4A, an image 402, which may be an example of image 105, may be provided to system 100 for processing. In image 402, seven loose or word bounding boxes 113 are depicted, wherein each bounding box 113 corresponds to a word from image 402. Different embodiments however may include a different number of bounding boxes 113 for the same image 402. For example, in another embodiment two bounding boxes, one for "St Ethelburga's" and one for "centre for reconciliation and peace" may be included.

FIG. 4A also includes a word patch 404 as may have been determined by input formatter 112. As referenced above, word patch 404 may include an extraction or cropping of at least a portion of image 402 based on one or more of bounding boxes 113. For example, word patch 404 may include those pixels that fall within one or more bounding boxes 113. As may be seen in word patch 404, image 402 has been cropped based on bounding box 113 for the word "Ethelburga's".

Figure 4B:
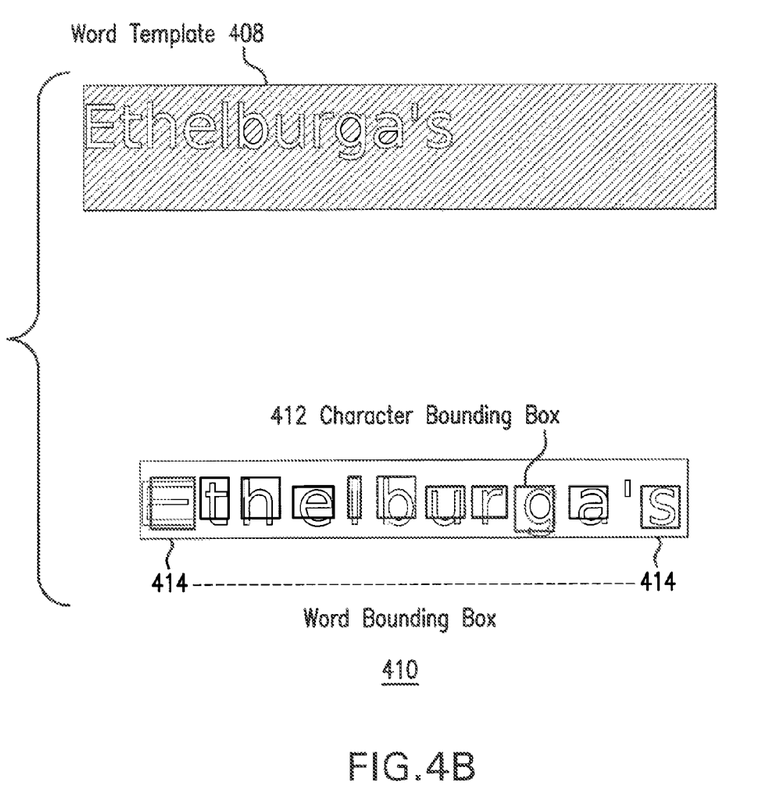
FIG. 4B illustrates examples of a word template and bounding boxes, according to an embodiment.

FIG. 4B illustrates examples of a word template and bounding boxes, according to an embodiment. Word template 408 may include an example embodiment of word template 116. As discussed above, word template 408 may be generated by template generator 114. Template generator 114 may have determined the font and an orientation of the font as applied to transcription 109 based on correlation with word patch 404, to generate word template 408.

The bottom image 410 of FIG. 4B shows exemplary bounding boxes based on bounding box 113 of image 402. Image 410 may include both a word bounding box 414 and a number of character bounding boxes 412. Word bounding box 414 may correspond to bounding box 113 of image 410. Word bounding box 414 may be used by system 100 to generate word patch 404, while character bounding boxes 412 may be used by character box refiner 118 to generate char template(s) 120. As shown in FIG. 4B, there are twelve character bounding boxes 412 and only a single word bounding box 414. Though in other example embodiments, the number of bounding boxes 412 and 414 may vary.

Figure 4C:
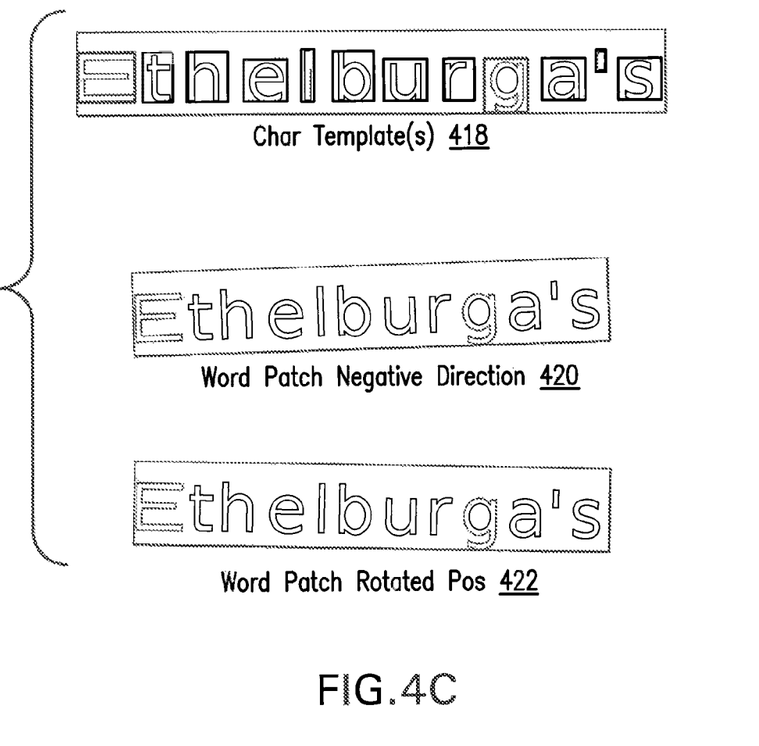
FIG. 4C illustrates examples of a char template and rotated word patches, according to an embodiment.

FIG. 4C illustrates examples of char template(s) 418 and rotated word patches, according to an embodiment. In the example shown, char template(s) 418 may include twelve char templates 418, one for each character of the word or text. Char template(s) 418 may be examples of char template(s) 120. In other example embodiments, each character or a subgroup of characters from image 402 may correspond to a char template 418 or for example, each char bounding box may be organized or grouped together and provided as a single char template 418.

Images 420 and 422 show an example of a word patch 404 being rotated in a negative or counter-clockwise direction and in a positive or clockwise direction, respectively. According to an example embodiment, the template generator 114 may rotate the word patch 404 negatively 420 and/or positively 422 to determine how to orient the font in the word template 116. The negative and positive adjustments may only be exemplary orientations for determining word template 116, whereby a negative rotation 420 may be rotating in a certain direction and a positive rotation 422 may be rotating in an opposite direction about a z axis perpendicular to a plane of word patch 404. As referenced above, other orientations may include other visual adjustments including, but not limited to, rotating word patch 404. Based on these adjustments, for example, template generator 114 may score the various orientations and determine the highest score orientation for word template 116.

Figure 4D:
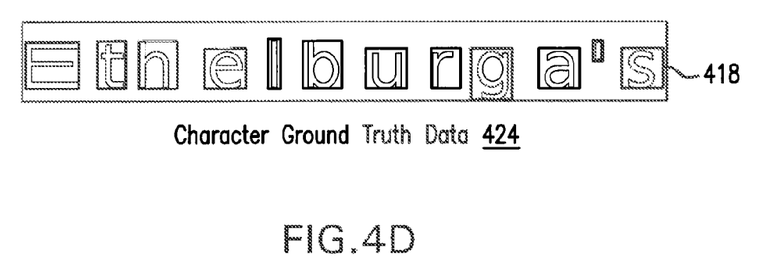
FIG. 4D illustrates an example of character ground truth data, according to an embodiment.

FIG. 4D illustrates an example of character ground truth data, according to an embodiment. In continuing the example from FIG. 4A, system 100 may produce character ground truth data 424 as shown in FIG. 4D. Character ground truth data 424 may be an example of character ground truth data 124. As may be seen in character ground truth data 424, each character or symbol of the word may include or be associated with a corresponding character template 418. Char templates 418 may have been scaled together to produce a more cohesive image of the text appearing in image 404. Character ground truth data 424 may then be provided to training module 132 to train OCR engine 130.

Method

Figure 5:
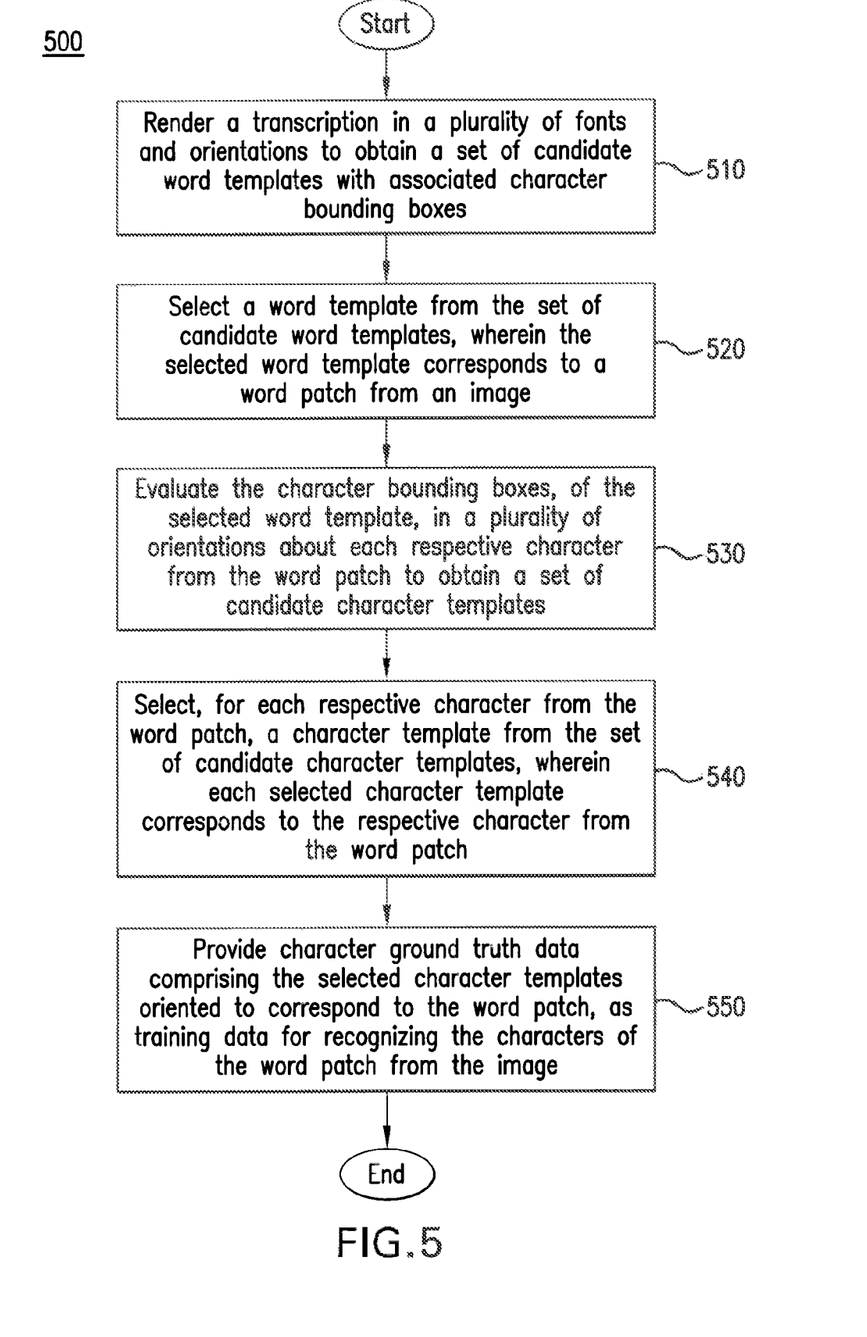
FIG. 5 is a system diagram that can be used to embody or implement various embodiments.

FIG. 5 is a flow chart of an example computer-implemented method 500 for obtaining data for training an OCR engine in a further embodiment.

At step 510, a transcription may be rendered in a plurality of fonts and orientations to obtain a set of candidate word templates with associated character bounding boxes. For example, template generator 114 may render transcription 109 in a plurality of fonts and orientations to obtain a set of candidate word templates with associated character bounding boxes.

At step 520, a word template may be selected from the set of candidate word templates, wherein the selected word template corresponds to a word patch from an image. For example, template generator 114 may select word template 116 from the candidate word templates, wherein the selected word template 116 may correspond to a word patch from image 105.

At step 530, the character bounding boxes, of the selected word template, may be evaluated in a plurality of orientations about each respective character from the word patch to obtain a set of candidate character templates. For example, character box refiner 118 may evaluate the character boxes, of the selected word template 116, in a plurality of orientations about each respective character from the word patch to obtain a set of candidate character templates.

At 540, for each respective character from the word patch, a character template may be selected from the set of candidate character templates, wherein each selected character template corresponds to the respective character from the word patch. For example, character box refiner 118 may select, for each respective character of the word patch, a set of candidate character templates that correspond to the respective characters from the word patch.

At step 550, character ground truth data comprising the selected character templates oriented to correspond to the word patch may be provided as training data for recognizing the characters of the word patch from the image. For example, output formatter 122 may provide character ground truth data 124 comprising the selected character templates 120 as training data to training module 132 for training OCR engine 130. After step 550, the process ends.

Computer System

Figure 6:
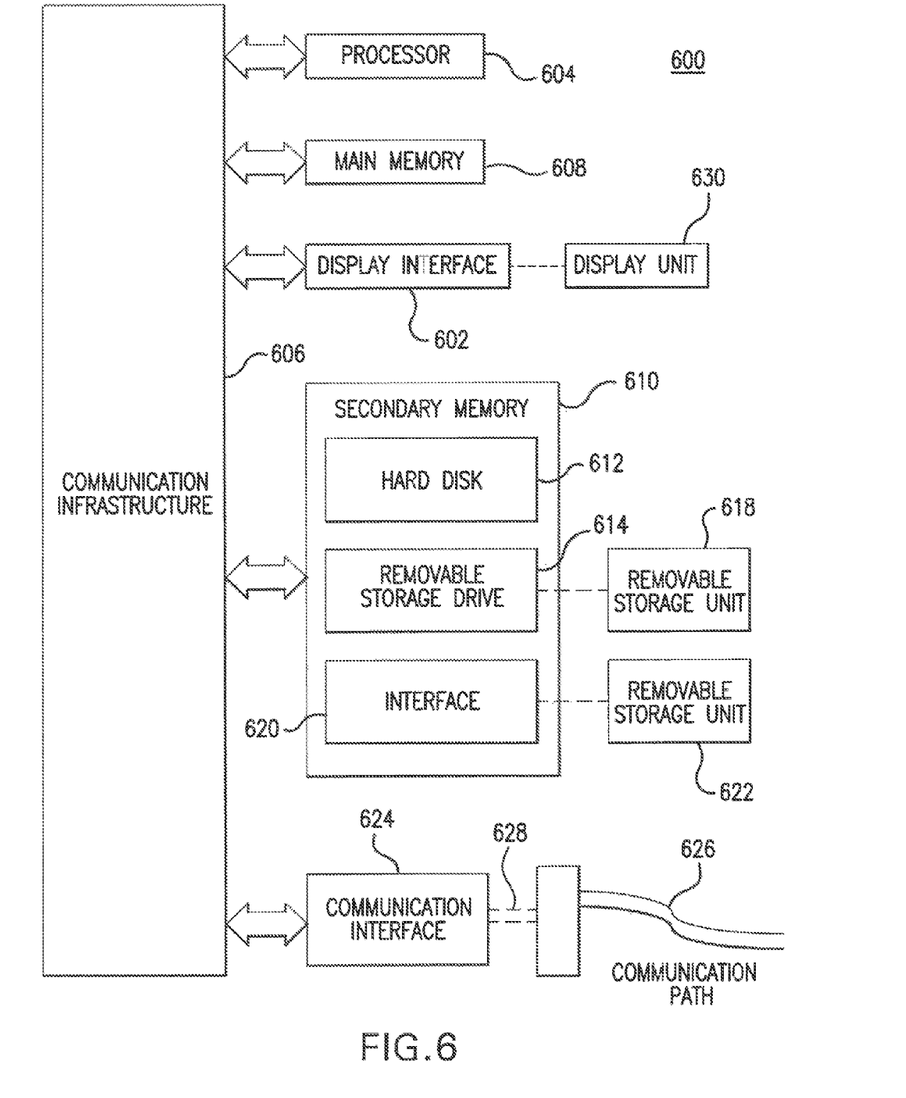
FIG. 6 is an example method for obtaining data for training an OCR engine according to an embodiment.

FIG. 6 illustrates an example computer system 600 in which embodiments of the present invention, or portions thereof, may be implemented as computer-readable code. For example, the CLG 110 and/or training module 132, including portions thereof, may be implemented in computer system 600 using hardware, software, firmware, tangible computer readable media having instructions stored thereon, or a combination thereof and may be implemented in one or more computer systems or other processing systems. Hardware, software, or any combination of such may embody any of the modules, procedures and components in FIGS. 1-4D and 5.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

Various embodiments of the invention are described in terms of this example computer system 600. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general-purpose processor device. As will be appreciated by persons skilled in the relevant art, processor device 604 may also be a single processor in a multi-core/multiprocessor system, such system operating alone, or in a cluster of computing devices operating in a cluster or server farm. Processor device 604 is connected to a communication infrastructure 606, for example, a bus, message queue, network, or multi-core message-passing scheme.

Computer system 600 also includes a main memory 608, for example, random access memory (RAM), and may also include a secondary memory 610. Secondary memory 610 may include, for example, a hard disk drive 612, removable storage drive 614. Removable storage drive 614 may comprise a floppy disk drive, a magnetic tape drive, an optical disk drive, a flash memory, or the like. Removable storage drive 614 reads from and/or writes to a removable storage unit 618 in a well-known manner. Removable storage unit 618 may comprise a floppy disk, magnetic tape, optical disk, etc. which is read by and written to by removable storage drive 614. As will be appreciated by persons skilled in the relevant art, removable storage unit 618 includes a computer usable storage medium having stored therein computer software and/or data.

Computer system 600 (optionally) includes a display interface 602 (which can include input and output devices such as keyboards, mice, etc.) that forwards graphics, text, and other data from communication infrastructure 606 (or from a frame buffer not shown) for display on display unit 630.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Communications interface 624 may include a modem, a network interface (such as an Ethernet card), a communications port, a PCMCIA slot and card, or the like. Software and data transferred via communications interface 624 may be in the form of signals, which may be electronic, electromagnetic, optical, or other signals capable of being received by communications interface 624. These signals may be provided to communications interface 624 via a communications path 626. Communications path 626 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 618, removable storage unit 622, and a hard disk installed in hard disk drive 612. Computer program medium and computer usable medium may also refer to memories, such as main memory 608 and secondary memory 610, which may be memory semiconductors (e.g. DRAMs, etc.).

Computer programs (also called computer control logic) are stored in main memory 608 and/or secondary memory 610. Computer programs may also be received via communications interface 624. Such computer programs, when executed, enable computer system 600 to implement the present invention as discussed herein. In particular, the computer programs, when executed, enable processor device 604 to implement the processes of the present invention, such as the stages in the method illustrated by the flowcharts in FIGS. 2-3 and FIG. 5 discussed above. Accordingly, such computer programs represent controllers of the computer system 600. Where the invention is implemented using software, the software may be stored in a computer program product and loaded into computer system 600 using removable storage drive 614, interface 620, and hard disk drive 612, or communications interface 624.

Embodiments may be directed to computer program products comprising software stored on any computer useable medium. Such software, when executed in one or more data processing device, causes a data processing device(s) to operate as described herein. Embodiments may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The Summary and Abstract sections may set forth one or more but not all exemplary embodiments of the present invention as contemplated by the inventor(s), and thus, are not intended to limit the present invention and the appended claims in any way.

While the present invention is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not he limited by any of the above-described exemplary embodiments, hut should be defined only in accordance with the following claims and their equivalents.

What is claimed is:

1. A computer-implemented method comprising:
rendering a transcription in a plurality of fonts and orientations to obtain a set of candidate word templates with associated character bounding boxes, wherein the transcription is provided as part of coarse ground truth data associated with a corresponding image, and wherein the transcription includes a textual translation of at least a portion of the image;
selecting a word template from the set of candidate word templates, wherein the selected word template corresponds to a word patch from the image;
evaluating the character bounding boxes, of the selected word template, in a plurality of orientations about each respective character from the word patch to obtain a set of candidate character templates, including orienting the character bounding boxes within an allowable orientation range for the character bounding boxes;
selecting, for each respective character from the word patch, a character template from the set of candidate character templates, wherein each selected character template corresponds to the respective character from the word patch; and
providing character ground truth data comprising the selected character templates oriented to correspond to the word patch, as training data for recognizing the characters of the word patch from the image.

2. The method of claim 1 further comprising:
receiving the course ground truth data comprising the image and a transcription of the word patch, wherein the image includes a word bounding box identifying a location of the word patch in the image.

3. The method of claim 2 further comprising:
cropping the word patch from the image based on the word bounding box;
converting the cropped word patch to grayscale; and
scaling the grayscaled word patch to a common height.

4. The method of claim 1 wherein the rendering comprises:
for each font of the plurality of fonts:
rendering the transcription in a first font of the plurality of fonts; and
evaluating the rendered transcription in a plurality of orientations to determine an orientation of the rendered transcription that most closely correlates to the word patch.

5. The method of claim 4 wherein the evaluating the rendered transcription comprises:
determining a correlation score for each orientation of the rendered transcription, wherein the correlation score comprises an indication of how closely the orientation of the rendered transcription correlates to the word patch; and
selecting the orientation with the highest correlation score as one of the candidate word templates.

6. The method of claim 5, wherein the selecting a word template comprises:
selecting the word template from the set of candidate word templates, wherein the selected word template has a highest correlation score amongst the correlation scores for the candidate word templates.

7. The method of claim 1 wherein the selecting comprises:
determining a correlation score for each orientation of the character bounding boxes, wherein the correlation score comprises an indication of how closely the oriented character bounding box correlates to the respective character of the word patch; and
selecting the oriented character bounding box with the highest correlation score for the character template.

8. The method of claim 1 wherein the providing comprises:
formatting the character templates based on the selected word template for output as the character ground truth data; and
providing the character ground truth data for training an optical character recognition (OCR) engine to recognize the word patch from the image.

9. The method of claim 1 wherein the providing comprises:
making a determination as to whether the character ground truth data exceeds a threshold score, wherein the threshold score indicates a minimum allowable level of correlation between the character ground truth data and the word patch of the image;
providing, when the threshold score is exceeded, the character ground truth data as the training data; and
rejecting, when the threshold score is not exceeded, the character ground truth data.

10. The method of claim 1 further comprising:
training an OCR engine to recognize word patches from a plurality of images based on the training data.

11. A system comprising:
one or more processors;
a memory coupled to the one or more processors;
a template generator configured to:
render a transcription in a plurality of fonts and orientations to obtain a set of candidate word templates with associated character bounding boxes, wherein the transcription is provided as part of coarse ground truth data associated with a corresponding image, and wherein the transcription includes a textual translation of at least a portion of the image, and select a word template from the set of candidate word templates, wherein the selected word template corresponds to a word patch from the image;

a character box refiner configured to:
- evaluate the character bounding boxes, of the selected word template, in a plurality of orientations about each respective character from the word patch to obtain a set of candidate character templates, including orienting the character bounding boxes within an allowable orientation range for the character bounding boxes, and
- select, for each respective character from the word patch, a character template from the set of candidate character templates, wherein each selected character template corresponds to the respective character from the word patch;

and an output formatter configured to:
- provide character ground truth data comprising the selected character templates oriented to correspond to the word patch, as training data for recognizing the characters of the word patch from the image.

12. The system of claim 11 further comprising:
an input formatter implemented on the processors and configured to extract the word patch from the image based on a word bounding box indicating the location of the word patch within the image.

13. The system of claim 11 wherein the template generator is configured to:
- score the orientation of each character bounding box such that the score indicates a level of correlation between the oriented character bounding box and the corresponding character from the word patch; and
- select, for each character template, the oriented character bounding box such that the score for the selected oriented character bounding box is greater than a score for any other orientation of the same character bounding box.

14. The system of claim 12 wherein the template generator is configured to:
- score the candidate word templates, for each of the plurality of fonts, at one or more of the plurality of orientations; and
- select the candidate word template with a highest score, based on the font and orientation of the candidate word template, as the selected word template.

15. The system of claim 12 further comprising:
a training module configured to train an optical character recognition (OCR) engine to recognize the word patch from the image based on the training data.

16. The system of claim 15 wherein the output formatter is configured to:
- determine a score based on a comparison of the character ground truth data to the word patch from the image; and
- provide the character ground truth data to the training module if the score exceeds a threshold of correlation.

17. The system of claim 15 wherein the output formatter is configured to:
- perform a consistency check to determine a consistency between the character ground truth data corresponding to a first word patch from the image and the character ground truth data corresponding to a second word patch from the image.

18. An apparatus comprising a non-transitory computer readable medium encoding instructions thereon that, when executed by a processor, cause the processor to perform operations comprising:
- rendering a transcription in a plurality of fonts and orientations to obtain a set of candidate word templates with associated character bounding boxes, wherein the transcription is provided as part of coarse ground truth data associated with a corresponding image, and wherein the transcription includes a textual translation of at least a portion of the image;
- selecting a word template from the set of candidate word templates, wherein the selected word template corresponds to a word patch from the image;
- evaluating the character bounding boxes, of the selected word template, in a plurality of orientations about each respective character from the word patch to obtain a set of candidate character templates, including orienting the character bounding boxes within an allowable orientation range for the character bounding boxes;
- selecting for each respective character from the word patch, a character template from the set of candidate character templates, wherein each selected character template corresponds to the respective character from the word patch; and
- providing character ground truth data comprising the selected character templates oriented to correspond to the word patch, as training data for recognizing the characters of the word patch from the image.

19. The apparatus of claim 18 wherein selecting a word template from the set of candidate word templates is based on a highest score from amongst a plurality of scores for each of the candidate word templates, wherein each score indicates a level of correlation between the font and orientation with word patch.

* * * * *